US006805969B2

(12) United States Patent
Pagilagan

(10) Patent No.: US 6,805,969 B2
(45) Date of Patent: Oct. 19, 2004

(54) COATING SOLUTIONS SUITABLE FOR IMPROVING THE ADHESION OF NYLON COATINGS AND PROCESSES FOR THE APPLICATION THEREOF

(75) Inventor: Rolando Umali Pagilagan, Parkersburg, WV (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/099,170

(22) Filed: Mar. 13, 2002

(65) Prior Publication Data

US 2002/0198330 A1 Dec. 26, 2002

Related U.S. Application Data

(60) Provisional application No. 60/275,565, filed on Mar. 14, 2001.

(51) Int. Cl.$^7$ .......................... B32B 25/00; B32B 27/24; B32B 27/34; B32B 27/36

(52) U.S. Cl. ................................ 428/474.7; 428/474.9; 428/475.2; 428/475.5; 524/323; 524/379

(58) Field of Search ........................... 428/474.7, 474.9, 428/475.2, 475.5; 524/323, 379

(56) References Cited

U.S. PATENT DOCUMENTS 4,992,515 A * 2/1991 Ballard ........................ 525/428
6,197,462 B1 * 3/2001 Yanus et al. ................... 430/56

* cited by examiner

Primary Examiner—Ana Woodward

(57) ABSTRACT

Novel coating solutions are disclosed that promote desirable adhesion to substrates formed from nylon, polyester, or a combination thereof. These coating solutions include nylons having specific solubility together with select formaldehyde resins and resin mixtures. The solutions provide superior adhesion and are therefore attractive to thread applications as well as formed structures.

16 Claims, No Drawings

COATING SOLUTIONS SUITABLE FOR IMPROVING THE ADHESION OF NYLON COATINGS AND PROCESSES FOR THE APPLICATION THEREOF

CROSS-REFERENCE TO RELATED APPLICATION

This application claims the benefit of U.S. Provisional Application No. 60/275,565, filed Mar. 14, 2001.

FIELD OF THE INVENTION

This invention is directed to improving the adhesion of nylon coatings on substrates of nylon and polyester. More specifically this invention is directed to the use of select formaldehyde resins with high imino content or partially alkylated or non-alkylated derivatives thereof to improve the adhesion of mixed nylon polymers to filaments, films, parts and the like made from nylons and polyesters.

BACKGROUND OF THE INVENTION

Nylon "multi-polymers" are nylons made from a mixture of nylon forming monomers such that the nylon polymer contains a mixture of at least two types of nylon structural units. These types of nylons are sold commercially for a variety of coatings and adhesive applications. Generally these nylons are readily soluble in organic solvents and are generally applied as solutions. See for example brochures entitled "Elvamide® Nylon Multipolymer Resins, Properties and Uses" (September 1977) and "Elvamide® Nylon Multipolymer Resins for Thread Bonding" (October 1977), both published by E.I. DuPont de Nemours and Company, Inc.

Typically, sewing threads are coated with polymeric materials (and with lubricants added in most cases) to protect them from abrasion during the sewing operation. Furthermore, with twisted multi-filament sewing threads the polymeric coatings (also referred to as thread bonding) also prevent fraying and unraveling (untwisting) of the individual filaments. See generally, the December 1990 DuPont brochure and Kohan, M. I., "Nylon Plastics Handbook" Hansen/Gardner Publications, Inc. (1995) pages 283–290.

Nylon multi-polymers have been used for thread bonding applications for several decades. However, there is increasing demand for improved adhesion of the coating to the thread, as for example in highly demanding modern applications. This is also of paramount importance for applications relying upon tightly woven fabric, for example in luggage and automotive air bags, leather, and the like. In such applications abrasion of the thread is high and the operating needle temperature is much higher compared to more loosely woven fabric applications such as those used in apparel. The poor adhesion of coatings results in a 'snake skin" effect where the coating comes off the surface of the thread. This results in loose coating material that jams the needle requiring stoppage of the operation. Further, poor aesthetics are associated with loose coating material as can be seen on inspection of the surface of the thread.

In the case of sewing threads and fabrics, nylon copolymers, terpolymers, and higher multi-polymers are used for coatings applications. These polymers are usually soluble in organic solvents, especially alcohols. The nylon coating is typically applied by dipping the thread in a solution of the nylon multi-polymer and then subsequently passing the thread through a drying chamber and then to a fusing chamber generally at a temperature above the melting point of the nylon mixed polymer. Melting of the nylon multi-polymer coating on the thread promotes adhesion. Nylon mixed polymers are generally favored for this use because of their toughness, good abrasion resistance, and ready solubility in solvents. For more information on these procedures and the benefits associated with nylon mixed polymers, see the Elvamide® (October 1977) brochure and the "Nylon Plastics Handbook" mentioned above.

The brochures mentioned above describe the ability of thermosetting resins such as epoxy, phenol-formaldehyde, and melamine-formaldehyde to cross-link nylon multi-polymers and improve the adhesion of the coating. The nylon multi-polymer reacts with these thermosetting resins to form thermoset-thermoplastic compositions.

U.S. Pat. No. 4,992,515 describes the use of Cymel® 1135 available from Cytek Industries, Inc., a fully alkylated melamine-formaldehyde resin, and strong acid catalyst to cross-link nylon 6/66/69, nylon 6/66/610, and nylon 6/66/612 terpolymers. The extent of cross-linking achieved was measured by the insolubility in the original solvent of the coating material after cross-linking. The cross-linked nylon coating becomes insoluble in the solvent. However, no data was provided as to how much improvement in adhesion and resistance to unraveling were achieved.

Various types and re-activities of formaldehyde derived cross-linking agents are disclosed in a brochure entitled "High Solids Amino Crosslinking Agents" (September 1994) available from Cytec. For example, Cymel® 325 used in several examples described below has free formaldehyde of 1.0 weight percent. Other grades of Cymel® can contain up to 3.5 weight percent free formaldehyde and are useful in the practice of the instant invention. These and other cross-linking agents are prepared by the reaction of amine functionalities with formaldehyde resulting in the replacement of the hydrogen on the amine functionality by a hydroxymethyl group. The hydroxymethy function is reacted with an alcohol to convert the hydroxy function to an alkoxy. Many classes of these crosslinking agents are possible depending on the extent of reaction. For example, there are commercially available types in melamine-formaldehyde cross-linking resins. Partial reaction of the amino functionalities in melamine (Structure 1 below)

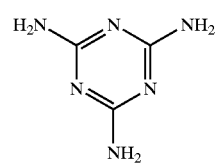

Structure 1

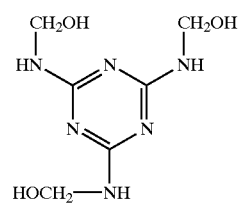

Structure 2 results in Structure 2 where only some of the hydrogens have been replaced by the hydroxymethyl groups. Alkylation reaction of Structure 2 with an alcohol results in the conversion of the hydroxy group to alkoxy group as shown in Structure 3.

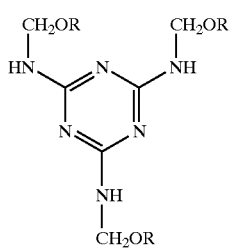

Structure 3

Melamine-formaldehyde resins containing the type of functionality as in Structure 3 are classified as high imino-type resins. Complete replacement reaction of melamine with formaldehyde and subsequent partial alkylation results in Structure 4.

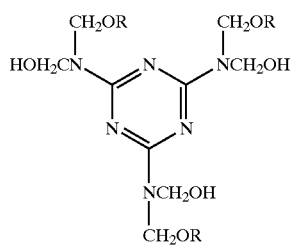

Structure 4

Again resins containing this type of functionality are classified as partially alkylated. If the reaction with alcohol is allowed to reach completion the fully alkylated derivative (Structure 5)

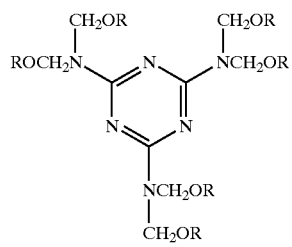

Structure 5 is obtained. Those having skill in the art will readily appreciate that different classes of functionalities (eg, amino or alkoxy groups) may be designed into the molecule. Each class is chemically distinct and has different characteristics and re-activities. The fully alkylated resins such as Cymel® 1135 require catalysis by strong acids to initiate their reaction.

There is a longstanding need for a technique to improve the overall adhesion of nylon coatings to substrates of nylon and polyester. Improvements in such adhesion will promote better aesthetic qualities to the article formed, and also provide an economic benefit in that less material is rejected as nonconforming for the intended final product.

An object of the instant invention is to develop a processing technique and coating solutions to improve the adhesion of nylon coatings to nylons, polyesters, and mixtures thereof. This development applies not only to threads but in general to any substrates where such adhesion is desirable. A further object of the instant invention is to provide such techniques and solutions that are readily adaptable and useful for a variety of applications including monofilaments, multifilaments, films, tubings, shaped parts and the like. A feature of the present invention is the durability of the adhesive bond itself making it suitable for rigorous applications in which the material is extensively handled and manipulated. An advantage of the present invention is that the procedure may utilize any of a variety of solvents. These and other objects, features and advantages of the invention will become better understood upon having reference to the following descriptions of the invention.

SUMMARY OF THE INVENTION

Coating solutions to promote the adhesion of polyamides to substrates of polyamides, polyesters or mixtures thereof are disclosed herein. These solutions comprise:
  (a) polyamide having a solubility of at least 0.5 weight percent in select organic solvents, and
  (b) 1 to 100 weight percent based on the weight of the polyamide of high imino, partially alkylated or non-alkylated formaldehyde resins selected from the group consisting of melamine-formaldehyde, glycoluril-formaldehyde, benzoguanamine-formaldehyde, and mixtures thereof.

Optionally, 0–20 weight percent based on the weight of the formaldehyde resin of a catalyst may be added. Additionally, fully alkylated melamine-formaldehyde, glycoluril-formaldehyde, or benzoguanamine-formaldehyde resins may be added. The resins (b) function as adhesion promoters. The resins (b) are preferably incorporated in the range of 1–40 weight percent (most preferably 1–20 weight percent) based on the weight of the polyamide.

There are also disclosed herein processes for the coating of these substrates with the coating solutions of the invention. Such processes are readily appreciated by those having skill in the art. See for example the thread coating procedures described herein.

DETAILED DESCRIPTION OF THE INVENTION

Nylons suitable as coating materials for purposes of the instant invention are polyamides derived from a lactam containing 6–12 carbon atoms, polyamides derived from 2–12 carbon diamines and 6–12 carbon diacids, polyamides derived from polypropylene glycol diamine or polyethylene glycol diamine and 6–12 carbon atom diacids and mixed polymers of the aforementioned polyamides with the proviso that these polyamides must have a solubility of at least 0.5 weight percent in alcohols, phenols, cresols, or mixtures of these solvents. Preferably the polyamide suitable as coating material is a multi-polymer such as 6/66 copolymer or 6/66/X where X is a polyamide derived from lactam containing 7–12 carbon atoms or polyamide derived from 2–12 carbon diamines and 6–12 carbon diacids.

Suitable solvents of the instant invention are methanol, ethanol, 1-propanol, 2-propanol, 1-butanol, furfuryl alcohol, benzyl alcohol, phenols, and m-cresols or combinations of these solvents. The selected solvent or combination of solvents may also contain water. Additionally, chlorinated solvents may be added as diluent. The selection of suitable solvent will also depend on several factors as is appreciated by those of skill in the art, such as geometry of the substrate, thickness of the article, and the like.

Examples of polyamides suitable as substrates herein for mono-filaments, multi-filaments, films, or tubings are those derived from 4–12 carbon diamines and 6–12 carbon diacids, lactams with 6–12 carbon atoms and mixed polymers of the aforementioned monomers. Examples of polyesters suitable for mono-filaments, multi-filaments, films, or tubings are polyethylene terephthalate, polypropylene terephthalate, or polybutyleneterephthalate, and their copolymers. It is recognized by those familiar with the art that adhesion and compatibility between polymers are favorable when the two polymers are of the same class or type ie polar polymers will tend to have better adhesion with other polar polymers. Thus, nylon is inherently more adherent to other nylons than to polyesters.

The melamine-formaldehyde resins suitable for these inventions are those that contain imino and hydroxymethyl moieties such as Cymel® 325, 1158, 385, 1172 and 1123. These are commercial grades of materials available from Cytek Industries, Inc. The melamine-formaldehyde resins, with or without the catalyst, preferably is added to the nylon multi-polymer solution and applied to the substrate as a single solution. However, with comparable effectiveness, the melamine-formaldehyde resins, with or without the catalyst, can be pre-coated to the substrate.

Suitable catalysts are inorganic acids such as phosphoric acid, organic acids such as p-toluenesulfonic acid, acetic acid, oxalic acid, and phthalic acid.

Materials other than threads such as mono-filaments, tubings, fabrics, films and other extruded or molded parts, in many cases, also could be coated with nylon polymer to enhance surface properties. These properties include for example abrasion resistance, barrier properties or the modification of the surface of a polymer such as polyester to make the surface more polar for a subsequent operations where the modified surface may be more amenable.

Articles to which the instant coating solutions have been applied are also disclosed and claimed herein. A coated article comprising a substrate of polyamides, polyesters, or mixtures thereof is first provided. Then a coating solution is applied thereto to form a precoated substrate. The coating solution comprises at least 0.5 weight percent of high imino, partially alkylated, or non-alkylated formaldehyde resins selected from the group consisting of melamine-formaldehyde, glycoluril-formaldehyde, benzoguanamine-formaldehyde and mixtures thereof. Finally a polyamide with a solubility of at least 0.5 weight percent in select organic solvents is applied to the precoated substrate.

The invention will become better understood and appreciated upon having reference to the following examples.

EXAMPLES

Thread Coating Procedure

The thread coating was conducted in a laboratory coating unit similar to the one described in the DuPont brochure relating to Elvamide® (October 1977) and the "Nylon Plastics Handbook", both referenced earlier. The drying and fusing sections are heated with hot nitrogen passed through electrical tube heaters provided with controllers to allow independent temperature control of the two sections. In a typical coating experiment the thread is passed between cheesecloth saturated with the coating solution by continuously dripping the coating solution onto the cloth from a dropping funnel. The residence time of the thread in the drying section is six seconds and also six seconds in the fusing section. The residence time is controlled by the take up speed of the spool motor. To provide a basis for accurate comparisons, the specified threads were always selected from the same spool.

Abrasion Resistance & Interply Adhesion

After coating the thread is conditioned in a 50% Relative Humidity (RH) chamber for six days before testing. One end of the thread is attached to a reciprocating arm driven by an electric motor (at a rate of 44 cycles/minute) and the other end to a 230.0 g weight (such that the thread abraids against the nylon 66 mono-filament). The thread hangs over a nylon 66 mono-filament with a diameter of 0.025-inch to 0.030-inch. There is provided a counter that records the number of cycles. During the test, the appearance of the thread is observed visually through a 50× magnifying lens. The point where the coating has abraded is observed as the number of cycles. Increased number of cycles reflects increased abrasion resistance.

The interply adhesion of the samples is compared qualitatively by twisting the coated thread opposite the original twist direction. A qualitative grading system from 0 to 3 was used. Zero is when the plies completely separate from each other; 1 is when the plies separate but some portion of the plies are still attached to each other; 2 is when only a small portion of the plies separate from each other; and 3 is when there is no visible separation of the plies. In close cases, gradations in units of 0.5 were used (for example, "1.5" and "2.5").

Examples 1 & 2

An 11.0 percent by weight solution of Elvamide® 8061 was made by heating Elvamide® 8061 and methanol in a flask fitted with a magnetic stirrer and a condenser. The amount of solution required depends on the amount of thread to be coated. In a typical experiment a 100-gram solution is made by heating 11.0 grams of Elvamide® 8061 and 89.0 grams of methanol.

A 210-denier, 3-ply nylon thread was coated as described above using 6 seconds residence time in the drying section and 6 seconds in the fusing section. Results are shown in the table below.

| EXAMPLE | DRYING TEMP., C. | FUSION TEMP. C. | WT. % COATING | CYCLES TO ABRASION | INTERPLY ADHESION |
|---|---|---|---|---|---|
| Comp. 1 | 80 | 120 | 4.5 | 24 | 3 |
| Comp. 2 | 120 | 170 | 4.7 | 53 | 3 |

Examples 3 & 4

A methanol solution containing 11.0 weight percent Elvamide® 8061, 2.0 weight percent Cymel® 1135 and 0.2 weight percent p-toluenesulfonic acid was prepared as in Example 1. This solution was used to coat a 210-denier, 3-ply nylon thread as in Example 1. This example is in accordance with U.S. Pat. No. 4,992,515 using a fully alkylated melamine-formaldehyde cross-linking agent and a strong acid catalyst.

| EXAMPLE | WT. % CYMEL ® | WT. % p-TOLUENE-SULFONIC ACID | DRYING TEMP., C. | FUSION TEMP. C. | WT. % COATING | CYCLES TO ABRASION | INTERPLY ADHESION |
|---|---|---|---|---|---|---|---|
| Comp. 3 | 2% Cymel(R) 1135 | 0.2 | 80 | 120 | 3.7 | 32 | 2 |
| Comp. 4 | 2% Cymel(R) 1135 | 0.2 | 120 | 170 | 4.1 | >200 | 1 |

The results show that at the lower fusion temperature (Example 3) the abrasion resistance is not significantly different than Elvamide® 8061 by itself (Example 1). The abrasion resistance at the higher fusion temperature (Example 4) was significantly improved but the interply adhesion was very poor.

Examples 5 to 16

Solutions for coating were prepared as in the previous examples using a ration of 11.0 weight percent Elvamide® 8061 in combination with various Cymel® cross-linking agents. These solutions were used to coat 210-denier, 3-ply nylon thread as in Example 1.

(Comp. Example 1) and with good interply adhesion. However, at the higher fusion temperature although the abrasion resistance was improved, the interply adhesion was poor (Comp. Example 6). On the other hand, the use of both Cymel® 325 a high imino cross-linking agent (Examples 7 to 10) and 385 a partially alkylated cross-linking agent (Examples 11 to 14) and mixtures with fully alkylated Cymel® 303 (Examples 15 and 16) afforded both good abrasion resistance and interply adhesion.

Examples 17 to 36

Solutions for coating were prepared as in the previous examples using a concentration of 11.0 weight percent

| EXAMPLE | WT. % CYMEL ® | WT. % p-TOLUENE-SULFONIC ACID | DRYING TEMP., C. | FUSION TEMP. C. | WT. % COATING | CYCLES TO ABRASION | INTERPLY ADHESION |
|---|---|---|---|---|---|---|---|
| Comp. 5 | 2% Cymel(R) 303 | 0.2 | 80 | 120 | 3.4 | 53 | 2.5 |
| Comp. 6 | 2% Cymel(R) 303 | 0.2 | 120 | 170 | 4.4 | >200 | 0.5 |
| 7 | 2% Cymel(R) 325 | 0.2 | 80 | 120 | 4.1 | 20 | 3 |
| 8 | 2% Cymel(R) 325 | 0.2 | 120 | 170 | 5.6 | >200 | 2 |
| 9 | 2% Cymel(R) 325 | 0 | 80 | 120 | 2.9 | 148 | 3 |
| 10 | 2% Cymel(R) 325 | 0 | 120 | 170 | 4.9 | 75 | 3 |
| 11 | 2% Cymel(R) 385 | 0.2 | 80 | 120 | 3.4 | 28 | 3 |
| 12 | 2% Cymel(R) 385 | 0.2 | 120 | 170 | 4.4 | >200 | 1.5 |
| 13 | 2% Cymel(R) 385 | 0 | 80 | 120 | 4.4 | 42 | 3 |
| 14 | 2% Cymel(R) 385 | 0 | 120 | 170 | 4.7 | 45 | 3 |
| 15 | 2% of 1/1 Cymel(R) 303/325 | 0 | 80 | 120 | 4 | 74 | 3 |
| 16 | 2% of 1/1 Cymel(R) 303/325 | 0 | 120 | 170 | 1.2 | 150 | 3 |

Comparative Examples 5 and 6 illustrate the use of another fully alkylated melamine-formaldehyde resin in accordance with U.S. Pat. No. 4,992,515. At the lower fusion temperature (Comp. Example 5) the abrasion resistance was slightly better than with Elvamide® 8061 alone Elvamide® 8061 in combination with various Cymel® cross-linking agents. These solutions were then used to coat 220-denier, 3-ply polyethyleneterephthalate thread as in Comp. Example 1.

| EXAMPLE | WT. % CYMEL ® | WT. % CATALYST | DRYING TEMP., C | FUSION TEMP. C | WT. % COATING | CYCLES TO ABRASION | INTERPLY ADHESION |
|---|---|---|---|---|---|---|---|
| Comp. 17 | 0 | 0 | 80 | 120 | 3.2 | 14 | 2 |
| Comp. 18 | 0 | 0 | 120 | 170 | 0.6 | 14 | 2 |
| Comp. 19 | 1.1% Cymel(R) 1135 | 0.11% PTSA | 80 | 120 | 3.2 | 23 | 2 |
| Comp. 20 | 1.1% Cymel(R) 1135 | 0.11% PTSA | 120 | 170 | 1.9 | 9 | 2 |
| Comp. 21 | 1.1% Cymel(R) 303 | 0.11% PTSA | 80 | 120 | 1.9 | 25 | 1.5 |
| Comp. 22 | 1.1% Cymel(R) 303 | 0.11% PTSA | 120 | 170 | 2.9 | 8 | 2 |

-continued

| EXAMPLE | WT. % CYMEL ® | WT. % CATALYST | DRYING TEMP., C | FUSION TEMP. C | WT. % COATING | CYCLES TO ABRASION | INTERPLY ADHESION |
|---|---|---|---|---|---|---|---|
| 23 | 1.1% Cymel(R) 325 | 0.11% PTSA | 80 | 120 | 2.8 | 40 | 2 |
| 24 | 1.1% Cymel(R) 325 | 0.11% PTSA | 120 | 170 | 0.4 | 14 | 2.5 |
| 25 | 1.1% Cymel(R) 325 | 0.11% Ac ACID | 80 | 120 | 4.6 | 55 | 2 |
| 26 | 1.1% Cymel(R) 325 | 0.11% Ac ACID | 120 | 170 | 2.5 | 46 | 2 |
| 27 | 0.5% Cymel(R) 325 | 0 | 80 | 120 | 4.6 | 37 | 2.5 |
| 28 | 0.5% Cymel(R) 325 | 0 | 120 | 170 | 0.2 | 48 | 2.5 |
| 29 | 1.0% Cymel(R) 325 | 0 | 80 | 120 | 2.2 | 47 | 2.5 |
| 30 | 1.0% Cymel(R) 325 | 0 | 120 | 170 | 0.9 | 57 | 2 |
| 31 | 4.0% Cymel(R) 325 | 0 | 80 | 120 | 6.4 | >200 | 2 |
| 32 | 4.0% Cymel(R) 325 | 0 | 120 | 170 | 2.9 | 109 | 2.5 |
| 33 | 2.2% Cymel(R) 1158 | 0 | 80 | 120 | 5 | 44 | 2.5 |
| 34 | 2.2% Cymel(R) 1158 | 0 | 120 | 170 | 2.23 | 44 | 2.5 |
| 35 | 2.2% Cymel(R) 1158 | 0.022% PTSA | 80 | 120 | 4.6 | 66 | 2.5 |
| 36 | 2.2% Cymel(R) 1158 | 0.022% PTSA | 120 | 170 | 1.9 | 39 | 2 |

PTSA = p-Toluenesulfonic acid
Ac ACID = Acetic acid

Comp. Examples 17 and 18 using Elvamide® 8061 alone showed abrasion resistance of only 14 which is much lower than those obtained with nylon thread Comp. Examples 1 and 2. This difference in abrasion resistance exemplifies the inherently low adhesion between dissimilar polymers such as nylon and polyester. The interply adhesion is still fairly good. The use of a fully alkylated melamine-formaldehyde cross-linking agent such as Cymel® 1135 or 303 and p-toluene sulfonic acid catalyst as described in U.S. Pat. No. 4,992,515 did not result in significant improvement in abrasion resistance (Comp. Examples 19 to 22). On the other hand, the use of high imino melamine-formaldehyde cross-linking agents such as Cymel® 325 and 1158 resulted in significant improvement in both abrasion resistance and interply adhesion.

Examples 37 to 40

A 220-denier, 3-ply polyethyleneterephthalate thread was pre-coated with a 6.0 weight percent Cymel® 350 and 1.0 weight percent p-toluenesulfonic acid catalyst in methanol using 6 seconds residence time at 80 C in the drying section and 6 seconds at 170 C in the fusion section. The pre-coated thread is then coated as in Example 1 with an 11.0 weight percent solution of Elvamide® 8061 in methanol without additional catalyst (Examples 37 & 38) and with an 11.0 weight percent Elvamide® 8061 and 1.0 weight percent p-toluenesulfonic acid solution in methanol (Examples 39 & 40).

| EXAMPLE | WT. % p-TOLUENE-SULFONIC ACID | DRYING TEMP., C | FUSION TEMP., C | WT. % COATING | CYCLES TO ABRASION | INTERPLY ADHESION |
|---|---|---|---|---|---|---|
| 37 | 0 | 80 | 120 | 5.5 | 41 | 2.5 |
| 38 | 0 | 120 | 170 | 4.3 | Over 80 | 2.5 |
| 39 | 1.0 | 80 | 120 | 6.9 | 54 | 2 |
| 40 | 1.0 | 120 | 170 | 3.4 | Over 100 | 2.5 |

The results show that pre-coating the polyester thread with the Cymel® 350, a fully alkylated resin, afforded very good abrasion resistance and interply adhesion in contrast to Comparative Examples 19 to 22. The presence of catalyst in the subsequent coating with the Elvamide® 8061 was found not to have significant adverse or beneficial effects.

What is claimed is:

1. Coating solutions which suitably adhere to substrates of polyamides, polyesters and mixtures thereof, comprising
   a) at least one organic solvent
   b) polyamide with a solubility of at least 0.5 weight percent in the organic solvent, and
   c) 1 to 100 weight percent based on the weight of the polyamide of one or more resins selected from the group consisting of high imino glycoluril-formaldehyde, partially alkylated glycoluril-formaldehyde, non-alkylated glycoluril-formaldehyde, high imino benzoguanamine-formaldehyde, partially alkylated benzoguanamine-formaldehyde, and non-alkylated benzoguanamine-formaldehyde.

2. The coating solutions of claim 1 further comprising up to 20 weight percent of a catalyst based on the weight of the formaldehyde resin.

3. The coating solutions of claim 2 wherein said catalyst is an inorganic acid.

4. The coating solutions of claim 1 wherein said solvent is selected from the group consisting of methanol, ethanol, 1-propanol, 2-propanol, 1-butanol, furfuryl alcohol, benzyl alcohol, phenol, m-cresol, and mixtures thereof.

5. The coating solutions of claim 1 wherein said resins (c) are present in an amount of 1–40 weight percent based on the weight of the polyamide.

6. The coating solutions of claim 1 wherein said resins (c) are present in an amount of 1–20 weight percent based on the weight of the polyamide.

7. The coating solutions of claim 1 wherein any of said resins (b) am high imino or partially alkylated.

8. Shaped structures of nylon or polyester to which the coating solution of claim 1 have been applied.

9. A coated article comprising (I) a substrate of polyamides, polyesters, or mixtures thereof, (II) a coating solution applied thereto to form a precoated substrate said coating solution comprising at least 0.5 weight percent of one or more formaldehyde resins selected from the group consisting of high imino glycoluril-formaldehyde, partially alkylated glycoluril-formaldehyde, non-alkylated glycoluril-formaldehyde, high imino benzoguanamine-formaldehyde, partially alkylated benzoguanamine-formaldehyde, and non-alkylated benzoguanamine-formaldehyde, and (III) a polyamide with a solubility of at least 0.5 weight percent in an organic solvents applied to said precoated substrate.

10. The coated article of claim 9 wherein said coating solution (II) further comprises up to 20 weight percent of a catalyst based on the weight of the formaldehyde resin.

11. Coating solutions which suitably adhere to substrates of polyamides, polyesters and mixtures thereof, comprising
  a) at least one organic solvent
  b) polyamide with a solubility of at least 0.5 weight percent in the organic solvent, and
  c) 1 to 100 weight percent based on the weight of the polyamide of one or more formaldehyde resins selected from the group consisting of high imino melamine-formaldehyde, partially alkylated melamine-formaldehyde and non-alkylated melamine-formaldehyde,
wherein a catalyst is not present.

12. The coating solutions of claim 11 wherein said solvent is selected from the group consisting of methanol, ethanol, 1-propanol, 2-propanol, 1-butanol, furfuryl alcohol, benzyl alcohol, phenol, m-cresol, and mixtures thereof.

13. The coating solutions of claim 11 wherein said resins (c) are present in an amount of 1–40 weight percent based on the weight of the polyamide.

14. The coating solutions of claim 11 wherein said resins (c) are present in an amount of 1–20 weight percent bused on the weight of the polyamide.

15. Shaped structures of nylon or polyester to which the coating solutions of claim 11 have been applied.

16. A coated article comprising (I) a substrate of polyamides, polyesters, or mixtures thereof, (II) a coating solution wherein a catalyst is not present applied thereto to form a precoated substrate, said coating solution comprising at least 0.5 weight percent of one or more formaldehyde resins selected from the group consisting of high imino melamine-formaldehyde, partially alkylated melamine-formaldehyde, and non-alkylated melamine-formaldehyde, and (III) a polyamide with a solubility of at least 0.5 weight percent in an organic solvent, applied to said precoated substrate.

* * * * *